(12) United States Patent
Zeng

(10) Patent No.: US 7,294,653 B2
(45) Date of Patent: Nov. 13, 2007

(54) SILICONE ANTIFOAMING AGENT

(75) Inventor: Jianren Zeng, Matsuda-machi (JP)

(73) Assignee: Dow Corning Toray Company, Ltd., Chiyoda-Ku, Tokyo (JP)

( * ) Notice: Subject to any disclaimer, the term of this patent is extended or adjusted under 35 U.S.C. 154(b) by 412 days.

(21) Appl. No.: 10/472,452

(22) PCT Filed: Mar. 20, 2002

(86) PCT No.: PCT/JP02/02722

§ 371 (c)(1),
(2), (4) Date: Feb. 10, 2004

(87) PCT Pub. No.: WO02/074407

PCT Pub. Date: Sep. 26, 2002

(65) Prior Publication Data

US 2004/0122113 A1   Jun. 24, 2004

(30) Foreign Application Priority Data

Mar. 21, 2001 (JP) ............................. 2001-081016

(51) Int. Cl.
B01D 19/04 (2006.01)
(52) U.S. Cl. .................. 516/124; 556/445; 528/28; 528/29
(58) Field of Classification Search ............... 516/124; 556/444, 445; 528/20, 28, 29
See application file for complete search history.

(56) References Cited

U.S. PATENT DOCUMENTS

| | | | |
|---|---|---|---|
| 3,280,160 A * | 10/1966 | Bailey | 556/444 |
| 3,526,651 A * | 9/1970 | Wassermeyer et al. | 556/446 |
| 3,784,479 A | 1/1974 | Keil | |
| 5,271,868 A | 12/1993 | Azechi et al. | |
| 5,486,549 A | 1/1996 | Itagaki et al. | |
| 6,417,258 B1 * | 7/2002 | Aoki et al. | 516/124 |
| 6,605,183 B1 | 8/2003 | Rautschek et al. | |
| 6,730,749 B1 * | 5/2004 | Burkhart et al. | 556/445 |

FOREIGN PATENT DOCUMENTS

| | | |
|---|---|---|
| EP | 0 663 255 | 12/1994 |
| EP | 1 076 073 | 6/2000 |

OTHER PUBLICATIONS

English language Abstract for JP 05 317607A; filed Dec. 3, 1993: Database WPI, Section Ch, Week 199402; Derwent Publication XP-002215688.

* cited by examiner

*Primary Examiner*—Daniel S. Metzmaier
(74) *Attorney, Agent, or Firm*—Howard & Howard Attorneys, P.C.

(57) ABSTRACT

Silicone antifoaming agent of the present invention demonstrates excellent antifoaming effect with regard to aqueous foaming systems, and is especially suitable for use in conjunction with inks where it significantly suppresses development of cissing during use of ink. The silicone antifoaming agent is characterized by comprising a polyoxyalkylene-modified silicone that has polyoxyalkylene groups expressed by general formula (1) and (2) given below and contains 10 to 200 diorganosiloxane units in one molecule, said polyoxyalkylene-modified silicone satisfying the following conditions: $3 \leq E \leq 90$ and $0.01 \leq E/(E+P) \leq 0.45$, wherein P is the total number of oxypropylene units ($-C_3H_6O-$) and E is the total number of oxyethylene units ($-C_2H_4O-$) contained in one molecule.

14 Claims, No Drawings

SILICONE ANTIFOAMING AGENT

TECHNICAL FIELD

The present invention relates to a silicone antifoaming agent that can demonstrate an excellent antifoaming effect, e.g., with respect to aqueous ink or a similar water-based system.

BACKGROUND ART

Polyoxyalkylene-modified silicone is characterized by many positive properties, such as low surface tension, high thermal and chemical stability, etc., and therefore this compound finds wide application in various fields in the form of foaming stabilizers, cosmetic additives, coating leveling agents, antifoaming agents, etc. Polyoxyalkylene groups suitable for modification consist of hydrophilic polyoxyelthylene groups (EO) and hydrophobic polyoxypropylene groups (PO). By varying an EO to PO ratio, it is possible to vary either polyoxyalkylene groups or a balance between hydrophilic and hydrophobic properties of the modified silicone oil. An antifoaming agent that contains a polyoxyalkylene-modified silicone is described, e.g., in Japanese Laid-Open Patent Application [Kokai] H5-57109, U.S. Pat. No. 5,271,868 and U.S. Pat. No. 5,804,099.

However, known antifoaming agents used for aqueous foaming systems need further improvement to enhance antifoaming performances. It is especially important and strongly desirable in ink application to provide highly performing antifoaming agent which does not cause cratering & cissing (so-called fish eye) when the ink composition containing an antifoaming agent is applied onto a substrate such an paper.

DISCLOSURE OF INVENTION

The above problems are solved by means of the silicone antifoaming agent of the invention. More specifically, the silicone-antifoaming agent of the invention comprises a polyoxyalkylene-modified silicone that contains 10 to 200 diorganosiloxane units per molecule and has polyoxyalkylene-modifying group expressed by general formula

  (1), where Q is a hydrogen atom, or a monovalent organic group selected from an alkyl group having 1 to 18 carbon atoms, an acyl group, an amino group that can be substituted, or an —N=C=O group, r is a number from 2 to 6, and s is a number from 5 to 50, and polyoxyalkylene) group expressed by general formula

  (2), where Q' is a hydrogen atom, or a monovalent organic group selected from an alkyl group having 1 to 18 carbon atoms, an acyl group, an amino group that can be substituted, or an —N=C=O group, r' is a number from 2 to 6, and s' is a number from 1 to 30, said polyoxyalkylene-modified silicone satisfying the following conditions:

$3 \leq E \leq 90$ and $0.01 \leq E/(E+P) \leq 0.45$, wherein P is the total number of oxypropylene units (—$C_3H_6O$—) and E is the total number of oxyethylene units (—$C_2H_4O$—) per molecule.

A polyoxyalkylene-modified silicone is a known compound, which is normally synthesized by the methods described below. It can be obtained by binding structures formed by interconnecting 1 to 10, or more, repeating units made up of oxyalkylene groups to some silicon atoms on the main chain or to terminal silicon atoms of the diorganopolysiloxane via alkylene groups.

A preferable antifoaming agent composed of a polyoxyalkylene-modified silicone of the invention can be expressed by the following general formula (3):

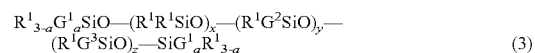  (3)

where $G^1$ is a group selected from $R^1$, $G^2$ or $G^3$, which can be different, and $R^1$ is independently an alkyl group with 1 to 18 carbon atoms or an aromatic group with 6 to 9 carbon atoms, $G^2$ is a group expressed by the following formula:

(where Q is a hydrogen atom or a monovalent organic group selected from an alkyl group having 11 to 18 carbon atoms, an acyl group, an amino group, that can also be substituted, or a —N=C=O group, r is a number from 2 to 6, and s is a number from 5 to 50), and $G^3$ is a group represented by the following formula:

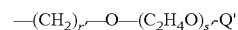

(where Q' is the same as Q, r' is a number from 2 to 6, and s' is a number from 1 to 30);

x is a number from 10 to 200, y is a number from 0 to 60, z is a number from 0 to 30; and a is 0 or 1, said polyoxyalkylene-modified silicone satisfying the following conditions:

$3 \leq E \leq 90$ and $0.01 \leq E/(E+P) \leq 0.45$, wherein P is the total number of oxypropylene units (—$C_3H_6O$—) and E is the total number of oxyethylene units (—$C_2H_4O$—) per molecule.

BEST MODE FOR CARRYING OUT THE INVENTION

A polyoxyalkylene-modified silicone that constitutes a silicone antifoaming agent of the present invention may be modified with polyoxyalkylene groups of two different types. The first type relates to polyoxypropylene groups expressed by aforementioned general formula (1), and the second the second type relates to polyoxyethylene groups expressed by aforementioned general formula (2).

A polyoxyalkylene-modified silicone normally consists of diorganopolysiloxane units without polyoxyalkylene-modifying groups, organopolysiloxane units with polyoxyalkylene-modifying groups, and terminal groups (normally, triorganosiloxy groups or siloxy groups with polyoxyalkylene-modifying groups).

The polyoxyalkylene-modified silicone of the present invention may have polyoxyalkylene-modifying groups only on siloxane units of the main chain, or instead of polyoxyalkylene-modifying groups on siloxane units of the main chain, respective polyoxyalkylene-modifying groups can be bonded to both siloxy groups on both terminals of the aforementioned polyoxyalkylene-modified silicone, or the polyoxyalkylene-modifying groups can be bonded to both the main chain and the terminals.

Group Q, which is a terminal group of the polyoxypropylene-modifying group of formula (1), may comprise a monovalent organic group and may be selected from an alkyl group having 1 to 18 carbon atoms, an acyl group, an amino group that can also be substituted, and an —N=C=O group (isocyanato group). Here, the alkyl groups can be exemplified by methyl, ethyl, propyl, butyl, hexyl, heptyl, and octyl groups. The alkyl groups may have a linear or a branched structure, but if the number of carbon atoms exceeds 18, the antifoaming polyoxyalkylene-modified silicone oil that contains such alkyl groups will have a viscosity increased to a level at which the antifoaming agent becomes unsuitable for use with aqueous foaming systems.

Acyl groups can be exemplified by acetyl, acryloyl, methacryloyl, or similar groups. In addition to —NH$_2$, other amino groups, that can also be substituted, are alkylamino, dialkylamino or similar groups. A suitable example of Q is an alkyl group having 1 to 6 carbon atoms. In this case, in formula (1), r should be between 2 and 6, and s should be between 5 and 50, and preferably, between 10 and 30.

On the other hand, Q' that represents a terminal group of the polyoxyethylene modifying group of general formula (2), may be the same as Q defined above. Here, r' should be between 2 and 6, and s' should be between 1 and 30, and preferably, between 5 and 15.

If the number of diorganosiloxane units is less than the lower limit of the above-mentioned range (10 to 200 units), the antifoaming effect of the antifoaming agent will be diminished because of an increase in solubility of the agent in aqueous foaming systems. If, on the other hand, the amount of the diorganosiloxane units exceeds the upper limit of the above-mentioned range, this will impair compatibility of the silicone antifoaming agent with aqueous foaming systems, and when such an agent is used in conjunction with ink, the ink applied onto a substrate will demonstrate cissing. Therefore, the preferable number of diorganosiloxane units is within the range from 50 to 150.

If the total number E of oxyethylene units in one molecule is below the lower limit of the above-mentioned range (which is 3 to 90), this will impair compatibility of the silicone antifoaming agent with aqueous foaming systems. For example, if in this case the silicone antifoaming agent is used with ink, the ink applied onto a substrate will demonstrate cissing. If, on the other hand, the amount of the diorganosiloxane units exceeds the upper limit of above-mentioned range, the antifoaming effect will be reduced because of an increased solubility of the antifoaming agent in aqueous systems.

In view of the above, it is preferable that total number of oxyethylene units in one molecule be within the range of 10 to 70.

If E/(E+P), the ratio of oxyethylene units to a total number of both oxyethylene and oxypropylene units contained in one molecule, is below the lower limit of the above-mentioned range (which is from 0.01 to 0.45), this will impair affinity between the silicone antifoaming agent and the aqueous foaming system. As a result, when this agent is used in conjunction with ink, the ink applied onto a substrate will demonstrate cissing. If, on the other hand, the E/(E+P) ratio exceeds the upper limit of the above-mentioned range, the silicone, antifoaming agent will become easily soluble in an aqueous foaming system, whereby the antifoaming effect of the agent will decrease. It is preferable that the E/(E+P) ratio be within the range of 0.1 to 0.35.

A silicone antifoaming agent comprising a polyoxyalkylene-modified silicone of the present invention satisfies with the conditions described above, and the preferable one may be expressed by aforementioned general formula (3). The $G^1$ in formula (3) is a group selected from $R^1$, $G^2$, or $G^3$. $R^1$ can be independently an alkyl group with 1 to 18 carbon atoms or an aromatic hydrocarbon group with 6 to 9 carbon atoms. The aforementioned alkyl group may have a linear or a branched structure. It can be represented, e.g., by a methyl, ethyl, propyl, butyl, hexyl, heptyl, octyl, or a similar group, preferably with 1 to 6 carbon atoms. An example of the aforementioned aromatic hydrocarbon group includes a phenyl group and the like.

$G^2$ is expressed by the following formula: —(CH$_2$)$_r$—O—(C$_3$H$_6$O)$_s$-Q, where Q, r, and s are the same as defined above.

In general formula (3), x is between 10 and 200, preferably between 50 and 150, y is between 0 and 60, preferably between 1 and 20, s is between 0 and 30, preferably between 1 and 10, and a is 0 or 1.

It is required, as has been mentioned earlier, that in aforementioned formula (3) the following conditions are satisfied: $3 \leq E \leq 90$ and $0.01 \leq E/(E+P) \leq 0.45$, where P is the total number of oxypropylene units (—C$_3$H$_6$O—) and E is the total number of oxyethylene units (—C$_2$H$_4$O—) contained in one molecule.

As has been mentioned above, the polyoxypropylene-modifying groups and polyoxyethylene-modifying groups can be bonded either to the main chain or to the terminals of the polyoxyalkylene-modified silicone. For example, a structure within the scope of the present invention may have a polyoxypropylene-modifying group bonded to silicon atom of a siloxy group on one terminal, and a polyoxyethylene-modifying group bonded to silicon atom of a siloxy group on another terminal, while a siloxane unit of the main chain may be without any polyoxyalkylene modifying group at all. This case has the formula (3), where y=0 and z=0.

In other words, when y=0 or z=0, at least one terminal siloxy group has a=1, and when y=z=0, both terminal siloxy groups have a=1.

It is recommended that the number of oxypropylene units (—C$_3$H$_6$O—) of polyoxypropylene groups bonded to silicon atom of siloxane units via an alkylene group is within the range of 5 to 50. If this number is less than the lower limit of the recommended range, the effect of the antifoaming agent will be diminished, and if this number exceeds the upper limit, the polyoxyalkylene-modified silicone will have an increased viscosity that will impair dispersibility of the agent in the foaming system. It is more preferable that the number of said oxypropylene units be within the range of 10 to 30.

It is recommended that the number of oxyethylene units (—C$_2$H$_4$O—) of oxyethylene groups bonded to silicon atom of siloxane units via alkylene groups is within the range of 1 to 30. If this number exceeds the upper recommended limit, it would be impractical since the polyoxyalkylene-modified silicone will exhibit a strong tendency to solidification. Most preferable number of aforementioned oxyethylene units is within the range of 5 to 15.

Furthermore, from the point of view of synthesis, it is necessary to select the number of siloxane units with polyoxypropylene groups bonded via alkylene groups within the range of 0 to 60, preferably of 1 to 20. When the above number of siloxane units is 0, it is naturally required that at least one siloxy group present at a main-chain terminal of the polyoxyalkylene-modified silicone containing polyoxyethylene-modifying group has polyoxypropylene-modifying group.

It is recommended that the number of siloxane units, having oxyethylene groups bonded via alkylene groups, be within the range of 0 to 30. If this number exceeds the upper limit of the recommended range, antifoaming capacity will be impaired due to an increase in solubility of the agent in an aqueous foaming system. It is preferable that the aforementioned number be within the range of 1 to 10. When the number of the aforementioned siloxane units is 0, it is naturally required that at least one siloxy group present at a main-chain terminal of the polyoxyalkylene-modified silicone containing polyoxypropylene-modifying group has polyoxyethylene-modifying group.

For use in aqueous foaming systems, it is preferable that the polyoxyalkylene-modified silicone contained in the antifoaming silicone agent of the invention has viscosity from 10 to 100,000 cSt.

The invention will be further described with reference to preferably practical embodiments.

PRACTICAL EMBODIMENT 1

Silicone antifoaming agent composed of polyoxyalkylene-modified silicone of general formula (4)

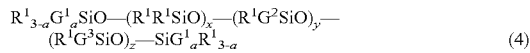
(4)

[where $G^1$ is a group selected from $R^1$, $G^2$, or $G^3$, where $R^1$ is independently an alkyl group with 1 to 6 carbon atoms or an aromatic group with 6 to 9 carbon atoms;

$G^2$ is a group expressed by the following formula:

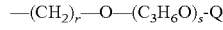

(where Q is a hydrogen atom or a monovalent organic group selected from an alkyl group having 1 to 6 carbon atoms, an acyl group, an amino group that can also be substituted, or isocyanato; r is a number from number from 2 to 6, and s is a number from 5 to 50); and $G^2$ is a group represented by the following formula:

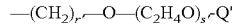

(where Q' is the same as Q, r' is a number 2 to 6, and s' is a number from 1 to 30); x is a number from 10 to 200, y is a number from 1 to 60, z is a number from 1 to 30, and a is 0.

however, there is a limitation consisting in that the following conditions should be observed:

$3 \leq E \leq 90$ and $0.01 \leq E/(E+P) \leq 0.45$, wherein P is the total number of oxypropylene units ($-C_3H_6O-$) and E is the total number of oxyethylene unite ($-C_2H_4O-$) contained in one molecule.]

PRACTICAL EMBODIMENT 2

Silicone antifoaming agent composed of polyoxyalkylene-modified silicone of general formula (5)

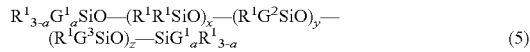
(5)

[where $G^1$ is a group selected from $R^1$, $G^2$, or $G^3$, where $R^1$ is independently an alkyl group with 1 to 6 carbon atoms or an aromatic group with 6 to 9 carbon atoms;

$G^2$ is a group expressed by the following formula:

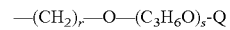

(where Q is a hydrogen atom or a monovalent organic group selected from an alkyl group having 1 to 6 carbon atoms, an acyl group, an amino group that can also be substituted, or isocyanato r is a number from 2 to 6, and s is a number from 5 to 50); and $G^2$ in a group represented by the following formula:

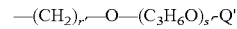

(where Q' is the same as Q, r' is a number from 2 to 6, and s' is a number from 1 to 30); x is a number from 10 to 200, y is a number from 0 to 60, z is a number from 0 to 30, and a is 1.

however, there is a limitation consisting in that the following conditions should be observed:

$3 \leq E \leq 90$ and $0.01 \leq E/(E+P) \leq 0.45$, wherein P is the total number of oxypropylene units ($-C_3H_6O-$) and E is the total number of oxyethylene units ($-C_2H_4O-$) contained in one molecule.]

PRACTICAL EMBODIMENT 3

Silicone antifoaming agent composed of polyoxyalkylene-modified silicone of general formula (6)

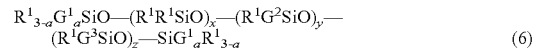
(6)

[where one $G^1$ is $G^2$ and another $G^1$ is $G^3$;

$R^1$ is independently an alkyl group with 1 to 6 carbon atoms or an aromatic group with 6 to 9 carbon atoms;

$G^2$ is a group expressed by the following formula:

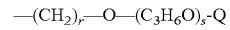

(where Q is a hydrogen atom or a monovalent organic group selected from an alkyl group having 1 to 6 carbon atoms, an acyl group, an amino group, that can also be substituted, or isocyanato; r is a number from 2 to 6, and s is a number from 5 to 50); and $G^3$ is a group represented by the following formula:

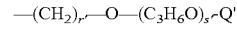

(where Q' is the same as Q, r' a number from 2 to 6, and s' is a number from 1 to 30); x is a number from 10 to 200, y is 0, z is 0, and a is 1.

however, there is a limitation consisting in that the following conditions should be observed;

$3 \leq E \leq 90$ and $0.01 \leq E/(E+P) \leq 0.45$, wherein P is the total number of oxypropylene units ($-C_3H_6O-$) and E is the number of oxyethylene units ($-C_2H_4O-$) contained in one molecule.]

PRACTICAL EMBODIMENT 4

Silicone antifoaming agent composed of polyoxyalkylene-modified silicone of general formula (7)

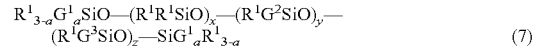
(7)

[where one $G^1$ is $G^2$ and another $G^1$ is $G^3$;

$R^1$ independently an alkyl group with 1 to 6 carbon atoms or an aromatic group with 6 to 9 carbon atoms;

$G^2$ is a group expressed by the following formula:

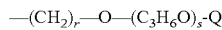
—$(CH_2)_r$—O—$(C_3H_6O)_s$-Q (where Q is a hydrogen atom or a monovalent organic group selected from an alkyl group having 1 to 6 carbon atoms, an acyl group, an amino group, that can also be substituted, or isocyanato; r is a number from 2 to 6, and s is a number from 5 to 50);

$G^3$ is a group represented by the following formula:

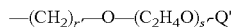
—$(CH_2)_{r'}$—O—$(C_2H_4O)_{s'}$-Q'

(where Q' is the same as Q, r' is number from 2 to 6, and s' is a number from 1 to 30); x is a number from 10 to 200, y is a number from 1 to 60, z is a number from 1 to 30, and a is 1.

however, there is a limitation consisting in that the following conditions should be observed:

$3 \leq E \leq 90$ and $0.01 \leq E/(E+P) \leq 0.45$, wherein P is the total number of oxypropylene units (—$C_3H_6O$—) and E is the total number of oxyethylene units (—$C_2H_4O$—) contained in one molecule.]

PRACTICAL EMBODIMENT 5

This is the same silicone antifoaming agent as in Practical Embodiment 1, except that in general formula (4) Q is an alkyl group with 1 to 6 carbon atoms, and Q' is also an alkyl group with 1 to 6 carbon atoms.

PRACTICAL EMBODIMENT 6

This is the same silicone antifoaming agent as in Practical Embodiment 2, except that Q in general formula (5) is an alkyl group with 1 to 6 carbon atoms, and Q' is also an alkyl group with 1 to 6 carbon atoms.

PRACTICAL EMBODIMENT 7

This is the same silicone antifoaming agent as in Practical Embodiment 3, except that Q in general formula (6) is an alkyl group with 1 to 6 carbon atoms, and Q' is [also] an alkyl group with 1 to 6 carbon atoms.

PRACTICAL EMBODIMENT 8

This is the same silicone antifoaming agent as in Practical Embodiment 4, except that Q in general formula (7) is an alkyl group with 1 to 6 carbon atoms, and Q' is [also] an alkyl group with 1 to 6 carbon atoms.

PRACTICAL EMBODIMENT 9

This is the same silicone antifoaming agent as in Practical Embodiment 2, except the Q in general formula (6) is an alkyl group with 1 to 6 carbon atoms, Q' is [also] an alkyl group with 1 to 6 carbon atoms, $G^1$ that substitutes a silicon atom of a siloxy group at one terminal is $G^2$, and another $G^1$ that is bonded to silicon atoms of terminal siloxy groups is also $G^2$, and z is a number from 1 to 30.

PRACTICAL EMBODIMENT 10

This is the same silicone antifoaming agent as in Practical Embodiment 2, except that Q in general formula (6) is an alkyl group with 1 to 6 carbon atoms, Q' is [also] an alkyl group with 1 to 6 carbon atoms, $G^1$ that substitutes a silicon atom of a siloxy group at one terminal is $G^3$, and another $G^1$ bonded to silicon atoms of terminal siloxy groups is also $G^3$, and y is a number from 1 to 60.

PRACTICAL EMBODIMENT 11

A silicone antifoaming agent comprising a polyoxyalkylene-modified silicone characterized in that the polyoxyalkylene-modified silicone consists of $R^1SiO_{3/2}$ or $SiO_{4/2}$ unit, and $R^1_2SiO_{2/2}$, $R^1_{3-a}G^1_aSiO_{1/2}$, $R^1G^2SiO_{2/2}$ and $R_1G^3SiO_{2/2}$ units, having totally 10 to 200 diorganosiloxane units per molecule, where $G^1$ is a group selected from $R^1$, $G^2$, or $G^3$, which can be different, and $R^1$ is independently an alkyl group with 1 to 18 carbon atoms or an aromatic group with 6 to 9 carbon atoms;

$G^2$ is a group expressed by the following formula:

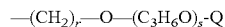
—$(CH_2)_r$—O—$(C_3H_6O)_s$-Q in which Q is a hydrogen atom or a monovalent organic group selected from an alkyl group having 1 to 18 carbon atoms, an acyl group, an amino group that can also be substituted, or an —N=C=O group, r is a number from 2 to 6, and s is a number from 5 to 50;

$G^3$ is a group represented by the following formula:

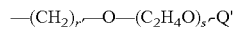
—$(CH_2)_{r'}$—O—$(C_2H_4O)_{s'}$-Q' in which Q' is the same as Q, r' is a number from 2 to 6, and s' is a number from 1 to 30); and a is 0 or 1, said polyoxyalkylene-modified silicone satisfying the following conditions:

$3 \leq E \leq 90$ and $0.01 \leq E/(E+P) \leq 0.45$, wherein P is the total number of oxypropylene units (—$C_3H_6O$—) and E is the total number of oxyethylene units (—$C_2H_4O$—) per molecule.

The silicone antifoaming agent of the present invention can be synthesized by methods known as hydrosilylation reaction. For example, it can be obtained by causing an addition reaction between a polyoxyalkylene compound having a vinyl (or allyl) group on a terminal of the main molecular chain and an organohydrogenpolysiloxane (i.e. between unsaturated bond of the polyoxyalkylene compound and SiH bond of the organohydrogenpolysiloxane) in the presence of a platinum catalyst.

The polyoxyalkylene-modified silicone of the instant invention can be prepared by addition reacting the first polyoxyalkylene compound having vinyl or allyl group, such as polyoxyethylene compound and polyoxypropylene compound both having vinyl or allyl group, with the organohydrogenpolysilxoane, followed by addition reaction of the second polyoxyalkylene compound having vinyl or allyl group, which is different from the first polyoxyalkylene compound, with unreacted, remaining SiH bond of said organohydrogenpolysiloxane. When the first polyoxyalkylene compound is polyoxyethylene compound, the second polyoxyalkylene compound is selected from polyoxypropylene compound. Reverse is also true. In those cases the first polyoxyalkylene compound should be reacted with the organohydrogenpolysiloxane, the mole ratio of the polyoxyalkylene compound being less than mole of SiH bond in the organohydrogenpolysiloxane to remain the unreacted SiH bond.

Alternatively the organohydrogenpolysiloxane can be reacted with said polyoxyethylene compound and said polyoxypropylene compound simultaneously.

The mole ratio of the polyoxyalkylene compound to the organopolysiloxane may be determined, depending on what and how to structure the polyoxylakylene-modified silicone to be desirable. The reaction conditions will be also determined by simple pre-experiment.

The platinum catalyst for the hydrosilylation reaction is well known in this art. Japanese Patent Kokai No. 2001-114895 (equivalent to U.S. Pat. No. 6,211,323) is cited for this reference.

Regarding methods of application of the silicone antifoaming agent of the invention, its use is not limited only to aqueous foaming systems and, if necessary, it can be used, e.g., in form of emulsion of oil-in-water systems. In this case, it is recommended to use an emulsifying agent of a non-ionic type. The antifoaming agent of the present invention can be admixed with antifoaming agents of other types. Examples of such antifoaming agents are silicone compounds composed of silicone oil and silica. If necessary, the agent of the present invention can be used in combination with other silicone-type and organic-type antifoaming agents.

There are no special limitations with regard to the amounts in which the antifoaming agents of the invention should be added to aqueous foaming systems, and in each case the added amount is determined in accordance with the required level of an antifoaming effect. In general, however, it should be added in an amount of 0.001 to 5% based on the weight of the aqueous foaming system.

PRACTICAL EXAMPLES

The invention will be further described in more detail with reference to practical examples, which, however, should not be construed as limiting the scope of the invention. In chemical formulae used in the practical examples, Me stands for methyl groups.

Reference Example 1

Synthesis of Polyoxyalkylene-modified Silicone for Use in Practical Example 1

A mixture was prepared from 29.57 g of organohydrogenpolysiloxane having SiH in a side molecular chain [Me$_3$SiO-(MeMeSiO)$_{55}$—(HMeSiO)$_7$—SiMe$_3$] and 3.49 g of a polyoxyethylene compound [CH$_2$=CH—CH$_2$—(C$_2$H$_4$O)$_{11}$—CH$_3$]. The mixture was heated to 70° C. and combined with 0.06 g of a platinum catalyst (a 2 wt. % isopropyl alcohol solution of chloroplatinic acid). The mixture was maintained at 70° C., and 10 min. later a polyoxypropylene compound [CH$_2$=CH—CH$_2$—(C$_3$H$_6$O)$_{24}$—CH$_3$] was added in an amount of 66.94 g. The mixture was again combined with a 0.06 g of a platinum catalyst, held for 30 min. at 70° C. and filtered out, thus producing a polyoxyalkylene-modified silicone.

Reference Example 2

Synthesis of Polyoxyalkylene-modified Silicone for Use in Practical Example 8

A mixture was prepared from 76.58 g of organohydrogenpolysiloxane having SiH only on both molecular chain terminals [HMe$_2$SiO-(MeMeSiO)$_{100}$—(SiMe$_2$H)] and 5.58 g of the polyoxyethylene compound used in Reference Example 1. The mixture was heated to 70° C. and combined with 0.06 g platinum catalyst used in Reference Example 1. The mixture was maintained at 70° C., and 10 min. later 17.84 g of the polyoxypropylene compound used in Reference Example 1 was added. The mixture was again combined with 0.06 g aforementioned platinum catalyst, held for 30 min. at 70° C. and filtered out, thus producing a polyoxyalkylene-modified silicone.

Practical Examples 1 to 10 and Comparative Examples 1 to 15

The tests described below were conducted with silicone antifoaming agents and, for comparison, with other modified silicones, shown in Tables 1 and 2, respectively. The aforementioned silicone antifoaming agents and modified silicones are expressed by the basic formulae shown below.

Practical Examples 1 to 7, 9, 10 and Comparative Examples 1 to 5, 8, 9, 14

The polyoxyalkylene-modified silicone used therein has the basic structural formula as follows:

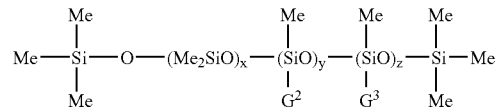

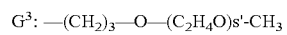

Practical Example 8

The polyoxyalkylene-modified silicone used therein has the structural formula as follows:

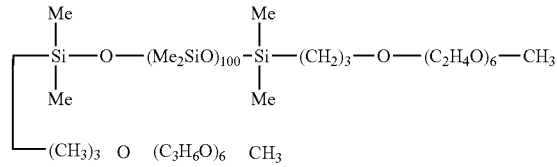

Comparative Example 6

The polyoxyalkylene-modified silicone used therein has the structural formula as follows:

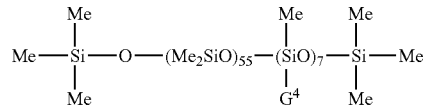

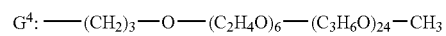

Comparative Example 7

The polyoxyalkylene-modified silicone used therein has the structural formula as follows:

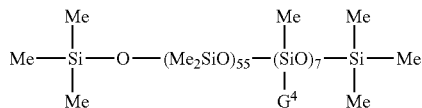

$G^4$: —(CH$_2$)$_3$—O—(C$_2$H$_4$O)$_6$—(C$_3$H$_6$O)$_{11}$—CH$_3$

Comparative Example 8

The polyoxyalkylene-modified silicone used therein has the basic structural formula as follows:

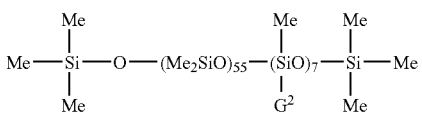

$G^2$: —(CH$_2$)$_3$—O—(C$_3$H$_6$O)$_{24}$—CH$_3$

Comparative Example 9

The polyoxyalkylene-modified silicone used therein has the basic structural formula as follows:

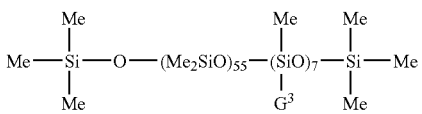

$G^3$: —(CH$_2$)$_3$—O—(C$_2$H$_4$O)$_{11}$—CH$_2$

Contents of the Test:

1. Test of Antifoaming Capacity

Samples were prepared by loading 40 g of an aqueous ink having a composition given below into a mayonnaise jar, and then 0.5% by weight of silicone antifoaming agent or an another silicone oil were added as effective component. The components were mixed for 10 min. by means of stirring blades rotating with the speed of 4000 rpm. Immediately after stirring was stopped, density of the ink (g/cm$^3$) was measured with the use of a specific-gravity cup at 25° C. The same samples were retained for 2 days at 40° C. and then its density was measured in the same manner. Those inks that had the density greater than 0.95 g/cm$^3$ after the storage for 2 days at 40° C., can be called "passed the test", but those that had the density below 0.95 g/cm$^3$ can be called "failed".

Aqueous ink composition: contained components (1) through (6) given below (all parts are by weight)

| (1) Pigment: Phthalo blue GNO-3* | 15 parts |
| (2) Aqueous ink varnish: Joncryl 61J** | 5 parts |
| (3) Aqueous ink varnish: Joncryl 7001** | 40 parts |
| (4) Polyethylene wax: | 5 parts |
| (5) Isopropyl alcohol: | 5 parts |
| (6) Water: | 30 parts |

*Product of Sumika Color Co., Ltd.
**Products of Johnson Polymer Co., Ltd.

2. Compatibility Test (Draw Down Test)

The same samples as for antifoaming test were prepared, stirred in the same antifoaming tester, and then applied in the form of a 18.3 μm-thick wet film onto a coat paper by means of a bar coater (No. 8) directly after stirring and after retaining at 40° C. for 2 days after stirring. The coating was dried at room temperature for 10 min. and then visually observed to find if there is any cartering/cissing to determine the compatibility of the antifoaming agent to the ink. Pass/non-pass decisions were also made with regard to the samples retained for 2 days at 40° C.

O: Cratering/cissing absent (passed)

X: Cratering/cissing present (did not pass)

3. Storage Test

The same samples as those prepared for the aforementioned antifoaming test and the aforementioned aqueous ink (without the antifoaming agent) were loaded into separate mayonnaise jars and held in an oven for 2 days at 40° C. The mayonnaise jars were placed onto a table and then inclined by 30° when the jar content was in a stable state. The results of the tests were judged by visually observing whether or not the sample in the jar has an extraordinary viscosity increase.

O: Extraordinary viscosity increase not observed (no gelation)

X: Extraordinary viscosity increase observed due to gelation or the like

Results of the aforementioned tests 1 to 3 are shown in Tables 3 and 4.

TABLE 1

| Pr. Ex. | Number of —(Me$_2$SiO) units in 1 molecule (x) | Number of —(MeG$^2$SiO) units in 1 molecule (y) s = 24 | Number of —(MeG$^3$SiO) units in 1 molecule (z) s' = 11 | s' = 6 | z/(y + z) | Total number of oxypropylene units in 1 molecule (P) | Total number of oxyethylene units in 1 molecule (E) | E/P + E | Molecular Weight |
|---|---|---|---|---|---|---|---|---|---|
| 1 | 55.0 | 6.0 | 1.0 | — | 0.14 | 144 | 11 | 0.07 | 12,592 |
| 2 | 55.0 | 5.2 | 1.8 | — | 0.26 | 125 | 20 | 0.14 | 11,942 |
| 3 | 55.0 | 4.0 | 3.0 | — | 0.43 | 96 | 33 | 0.26 | 10,968 |
| 4 | 55.0 | 3.5 | 3.5 | — | 0.50 | 84 | 39 | 0.32 | 10,562 |
| 5 | 33.0 | 2.0 | 1.0 | — | 0.33 | 48 | 11 | 0.19 | 5,736 |
| 6 | 14.4 | 2.0 | 1.0 | — | 0.33 | 48 | 11 | 0.19 | 4,322 |

TABLE 1-continued

| Pr. Ex. | Number of —(Me$_2$SiO) units in 1 molecule (x) | Number of —(MeG$^2$SiO) units in 1 molecule (y) s = 24 | Number of —(MeG$^3$SiO) units in 1 molecule (z) s' = 11 | s' = 6 | z/(y + z) | Total number of oxypropylene units in 1 molecule (P) | Total number of oxyethylene units in 1 molecule (E) | E/(P + E) | Molecular Weight |
|---|---|---|---|---|---|---|---|---|---|
| 7 | 70.0 | 2.0 | 1.0 | — | 0.33 | 48 | 11 | 0.19 | 8,548 |
| 8 | 100.0 | 0 | 0 | — | 0.50 | 24 | 11 | 0.31 | 9,532 |
| 9 | 140.0 | 13.0 | 6.0 | — | 0.32 | 312 | 66 | 0.17 | 30,544 |
| 10 | 33.0 | 1.0 | — | 2.0 | 0.67 | 24 | 12 | 0.33 | 4,418 |

TABLE 2

| Comp. Ex. | Number of —(Me$_2$SiO) units in 1 molecule (x) | Number of —(MeG$^2$SiO) units in 1 molecule (y) s = 24 | Number of —(MeG$^3$SiO) units in 1 molecule (z) s' = 11 | s' = 6 | z/(y + z) | Total number of oxypropylene units in 1 molecule (P) | Total number of oxyethylene units in 1 molecule (E) | E/(P + E) | Molecular Weight |
|---|---|---|---|---|---|---|---|---|---|
| 1 | 6.0 | 1.0 | — | 1.0 | 0.50 | 24 | 6 | 0.20 | 2,135 |
| 2 | 247.0 | 18.0 | 9.0 | — | 0.33 | 432 | 99 | 0.19 | 46,608 |
| 3 | 110.0 | 20.0 | 10.0 | — | 0.33 | 480 | 110 | 0.19 | 39,272 |
| 4 | 144.0 | 9.5 | 9.5 | — | 0.50 | 228 | 105 | 0.31 | 28,006 |
| 5 | 3.0 | 3.3 | 1.7 | — | 0.34 | 79 | 19 | 0.19 | 5,480 |
| 6 | | | | | See below | | | | |
| 7 | | | | | | | | | |
| 8 | 55.0 | 7.0 | — | — | | 168 | — | — | 13,404 |
| 9 | 55.0 | — | 7.0 | — | | — | 77 | 1.00 | 7,720 |
| 10 | Mixture/(Comp. Ex. 8 and 9) (90/10) | | | — | | | | | — |
| 11 | Mixture/(Comp. Ex. 8 and 9) (50/50) | | | — | | | | | — |
| 12 | Mixture/(Comp. Ex. 8 and 9) (30/70) | | | — | | | | | — |
| 13 | Mixture/(Comp. Ex. 8 and 9) (10/90) | | | — | | | | | — |
| 14 | 55.0 | 2.2 | 4.8 | — | 0.14 | 53 | 53 | 0.53 | 9,506 |
| 15 | — | — | — | — | — | — | — | — | — |
| 6 | 55.0 | | | | | 168 | 42 | 0.20 | 13,887 |
| 7 | 55.0 | | | | | 77 | 42 | 0.35 | 10,338 |

TABLE 3

| Practical Example. | Antifoaming Test Density (Initial) g/cm$^3$ | Density After 40° C./2 days g/cm$^3$ | Compatibility Test Initial | After 40° C./2 days | Storage Test Viscosity increase after 40° C./2 days | Overall Performance |
|---|---|---|---|---|---|---|
| 1 | 1.08 | 1.07 | ○ | ○ | ○ | Passed |
| 2 | 1.03 | 1.06 | ○ | ○ | ○ | Passed |
| 3 | 1.00 | 1.01 | ○ | ○ | ○ | Passed |
| 4 | 0.99 | 0.96 | ○ | ○ | ○ | Passed |
| 5 | 1.06 | 1.04 | ○ | ○ | ○ | Passed |
| 6 | 1.02 | 1.01 | ○ | ○ | ○ | Passed |
| 7 | 1.02 | 1.02 | ○ | ○ | ○ | Passed |
| 8 | 1.00 | 0.98 | x | ○ | ○ | Passed |
| 9 | 0.95 | 0.96 | ○ | ○ | ○ | Passed |
| 10 | 1.06 | 1.03 | x | ○ | ○ | Passed |

TABLE 4

| Comp. Example | Antifoaming Test Density (Initial) g/cm³ | Antifoaming Test Density After 40° C./2 days) g/cm³ | Compatibility Test Initial | Compatibility Test After 40° C./2 days | Storage Test Viscosity increase after 40° C./2 days | Overall Performance Jugemen |
|---|---|---|---|---|---|---|
| 1 | 1.06 | 0.91 | x | o | o | Failed |
| 2 | 0.92 | 0.92 | x | x | o | Failed |
| 3 | 0.89 | 0.85 | x | x | o | Failed |
| 4 | 0.89 | 0.82 | o | o | o | Failed |
| 5 | 0.93 | 0.85 | o | o | o | Failed |
| 6 | 1.10 | 0.82 | x | o | x | Failed |
| 7 | 1.03 | 0.84 | o | o | x | Failed |
| 8 | 1.09 | 1.07 | x | x | o | Failed |
| 9 | 0.80 | 0.80 | o | o | o | Failed |
| 10 | 1.09 | 1.05 | x | x | o | Failed |
| 11 | 1.07 | 1.03 | x | x | o | Failed |
| 12 | 1.04 | 0.99 | x | x | o | Failed |
| 13 | 0.94 | 0.88 | o | o | o | Failed |
| 14 | 0.83 | 0.82 | o | o | o | Failed |
| 15 | 0.82 | 0.82 | o | o | o | Failed |

Comparative Example 15 was for blank test where no antifoaming agent was added to the aqueous ink composition abovementioned.

INDUSTRIAL APPLICABILITY

The silicone antifoaming agent of the present invention demonstrates excellent antifoaming effect in aqueous foaming systems. When this agent is added to ink, it significantly suppresses development of cissing during use of the ink.

The invention claimed is:

1. A silicone antifoaming agent comprising a polyoxyalkylene-modified silicone is expressed by the following general formula $$R^1_{3-a}G^1_a SiO-(R^1R^1SiO)_x-R^1G^2SiO)_y-(R^1G^3SiO)_z-SiG^1_a R^1_{3-a} \quad (3)$$

where $G^1$ is $R^1$, $G^2$, or $G^3$, which can be different, and $R^1$ is independently an alkyl group with 1 to 18 carbons or an aromatic group with 6 to 9 carbon atoms;

$G^2$ is a group expressed by the following formula:

$$-(CH_2)_r-O-(C_3H_6O)_s-Q \quad (1),$$

where Q is a hydrogen atom, an alkyl group having 1 to 18 carbon atoms, an acyl group, an amino group, an alkylamino group, a dialkylamino group, or an —N=C=O group, r is a number from 2 to 6, and s is a number from 5 to 50;

$G^3$ is a group represented by the following formula:

$$-(CH_2)_{r'}-O-(C_2H_4O)_{s'}-Q' \quad (2),$$

where Q' is a hydrogen atom, an alkyl group having 1 to 18 carbon atoms, an acyl group, an amino group, an alkylamino group, a dialkylamino group, or an —N=C=O group, r' is a number from 2 to 6, and s' is a number from 1 to 30; x is a number from 10 to 200, y is a number from 0 to 60, z is a number from 0 to 30, and a is 0 or 1;

wherein said polyoxyalkylene-modified silicone contains 10 to 200 diorganosiloxane units per molecule and has the polyoxyalkylene-modifying group expressed by formula (1) and the polyoxyalkylene-modifying group expressed as formula (2), said polyoxyalkylene-modified silicone satisfying the following conditions:

$3 \leq E \leq 90$ and $0.01 \leq E/(E+P) \leq 0.45$, where P is the total number of oxypropylene units ($-C_3H_6O-$) and E is the total number of oxyethylene units ($-C_2H_4O-$) per molecule.

2. A polyoxyalkylene-modified silicone antifoaming agent as recited in claim 1 wherein, at least one of Q or Q' is a dialkylamino group.

3. A polyoxyalkylene-modified silicone antifoaming agent as recited in claim 1 wherein, at least one of Q or Q' is an alkyl group having from 1 to 6 carbon atoms.

4. A polyoxyalkylene-modified silicone antifoaming agent as recited in claim 1 wherein, said agent has from 50 to 150 diorganosiloxane units per molecule inclusively.

5. A polyoxyalkylene-modified silicone antifoaming agent as recited in claim 1 wherein, the total number of oxyethylene units is from 10 to 70 inclusively.

6. A polyoxyalkylene-modified silicone antifoaming agent as recited in claim 1 wherein, E/(E+P) ranges from 0.1 to 0.35 inclusively.

7. A polyoxyalkylene-modified silicone antifoaming agent as recited in claim 1 wherein, P has a value of from 5 to 50 inclusively.

8. A polyoxyalkylene-modified silicone antifoaming agent as recited in claim 1 wherein, P has a value of from 10 to 30 inclusively.

9. A polyoxyalkylene-modified silicone antifoaming agent as recited in claim 1 wherein, said agent has a viscosity of from 10 to 100,000 cSt inclusively.

10. A polyoxyalkylene-modified silicone antifoaming agent as recited in claim 1 wherein, x has a value of from 50 to 150 inclusively.

11. A polyoxyalkylene-modified silicone antifoaming agent as recited in claim 1 wherein, y has a value of from 1 to 20 inclusively.

12. A polyoxyalkylene-modified silicone antifoaming agent as recited in claim 1 wherein, z has a value of from 1 to 10 inclusively.

13. A polyoxyalkylene-modified silicone antifoaming agent as recited in claim 1 wherein, s has a value of from 10 to 30 inclusively.

14. A polyoxyalkylene-modified silicone antifoaming agent as recited in claim 1 wherein, s' has a value of from 5 to 15 inclusively.

* * * * *